US012618373B2

(12) United States Patent
Devasigamani et al.

(10) Patent No.: US 12,618,373 B2
(45) Date of Patent: **\*May 5, 2026**

(54) PROPULSION ASSEMBLY FOR AN AIRCRAFT

(71) Applicants: Airbus SAS, Blagnac (FR); Airbus Operations SAS, Toulouse (FR)

(72) Inventors: Nandakumar Devasigamani, Toulouse (FR); Lionel Czapla, Toulouse (FR); Jorge A. Carretero Benignos, Taufkirchen (DE)

(73) Assignees: Airbus SAS, Blagnac (FR); Airbus Operations SAS, Toulouse (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/909,029

(22) Filed: Oct. 8, 2024

(65) Prior Publication Data

US 2025/0121929 A1     Apr. 17, 2025

(30) Foreign Application Priority Data

Oct. 12, 2023     (FR) ...................................... 2310970

(51) Int. Cl.
*F02C 7/224* (2006.01)

(52) U.S. Cl.
CPC .................................... *F02C 7/224* (2013.01)

(58) Field of Classification Search
CPC ............. F02C 7/224; F02C 7/22; F02C 7/222
See application file for complete search history.

(56) References Cited

U.S. PATENT DOCUMENTS

| | | | |
|---|---|---|---|
| 3,237,400 A | | 3/1966 | Kuhrt |
| 5,203,163 A | * | 4/1993 | Parsons ..................... F02C 6/08 |
| | | | 60/785 |
| 11,753,995 B1 | | 9/2023 | Owoeye et al. |
| 11,927,136 B1 | * | 3/2024 | Burd ........................ F02C 7/143 |
| 12,065,965 B1 | * | 8/2024 | Oechsle .................. F02K 3/075 |
| 2013/0305686 A1 | * | 11/2013 | Conrardy .................. F02K 7/16 |
| | | | 60/226.1 |
| 2023/0022291 A1 | | 1/2023 | Carretero Benignos et al. |
| 2023/0167770 A1 | | 6/2023 | Carretero Benignos et al. |
| 2024/0011440 A1 | * | 1/2024 | Owoeye ............... F28D 20/021 |
| 2024/0328359 A1 | * | 10/2024 | Grech ........................ F02C 3/22 |

FOREIGN PATENT DOCUMENTS

| | | |
|---|---|---|
| EP | 4124738 A1 | 2/2023 |
| FR | 3127989 A1 | 4/2023 |

OTHER PUBLICATIONS

French Search Report for corresponding French Patent Application No. 2310970 dated Apr. 17, 2024.

\* cited by examiner

*Primary Examiner* — Rodolphe Andre Chabreyrie

(74) *Attorney, Agent, or Firm* — Greer Burns & Crain Ltd.

(57)     ABSTRACT

A propulsion assembly having a fairing, a combustion chamber housed in the fairing, an exhaust nozzle delimited by a nozzle wall, a dihydrogen tank, a double-walled supply duct between the tank and the combustion chamber that has an inner wall delimiting an inner volume for the circulation of the dihydrogen and, around it, an outer wall delimiting an outer volume, and a bypass chamber, which is positioned around the nozzle wall and in which is made an upstream orifice for the introduction of the combustion gases and a downstream orifice for the discharge of the combustion gases, and wherein the supply duct has a portion arranged in the bypass chamber.

15 Claims, 2 Drawing Sheets

PROPULSION ASSEMBLY FOR AN AIRCRAFT

CROSS-REFERENCES TO RELATED APPLICATIONS

This application claims the benefit of French Patent Application Number 2310970 filed on Oct. 12, 2023, the entire disclosure of which is incorporated herein by way of reference.

FIELD OF THE INVENTION

The present invention relates to a propulsion assembly for an aircraft, said propulsion assembly comprising a propulsion system having an exhaust nozzle that discharges the combustion gases from the propulsion system and a heat exchange system arranged at the exhaust nozzle for ensuring heat energy is transferred to the dihydrogen of the propulsion system, and to an aircraft having at least one such propulsion system.

BACKGROUND OF THE INVENTION

In order to move, an aircraft conventionally has at least one propulsion assembly comprising a propulsion system that is arranged in a nacelle and may take the form of a jet engine or a turboprop engine. In each case, the propulsion system has a rotary assembly that drives a fan or a propeller. The rotary assembly constitutes a core of the propulsion system and, from the front to the rear, it has an air inlet that allows the introduction of air into a duct of the core, a compressor that compresses the air thus introduced, a combustion chamber in which the air thus compressed is mixed with a fuel, and a turbine that allows the combustion gases to expand and generates the rotation that is transmitted to the fan or to the propeller.

Downstream of the turbine, an exhaust nozzle ensures discharge of the combustion gases.

It is also known, in particular in the case of dihydrogen, that the efficiency of the combustion of a fuel is improved if this fuel is heated before said combustion. It is also known to use some of the hot combustion gases discharged by the exhaust nozzle to heat the fuel.

SUMMARY OF THE INVENTION

An object of the present invention is to propose another solution for heating the dihydrogen before its combustion in complete safety.

To that end, a propulsion assembly for an aircraft is proposed, having:
a nacelle,
a propulsion system arranged inside the nacelle and comprising a fairing, a rotary assembly having a combustion chamber and housed in the fairing, an exhaust nozzle positioned downstream of the combustion chamber and delimited by a rear portion of the fairing, referred to as nozzle wall, and ensuring the discharge of the combustion gases originating from the combustion of the dihydrogen in the combustion chamber,
a dihydrogen tank,
a supply duct which connects the tank and the combustion chamber and is a double-walled duct with an inner wall delimiting an inner volume in which the dihydrogen circulates and, around it, an outer wall delimiting an outer volume, and a bypass chamber positioned around the nozzle wall, wherein at least one upstream orifice, arranged to allow the introduction of the hot combustion gases into the bypass chamber, and at least one downstream orifice, arranged to allow the discharge of the hot combustion gases from the deflection chamber, are made in the nozzle wall, and wherein the supply duct has a duct portion arranged in said chamber.

With such an arrangement, the heat energy of the combustion gases is transferred to the dihydrogen and the installation of a double-walled duct makes it possible to ensure a high level of safety, even in the event of a leak.

According to one particular embodiment, the outer volume contains a fluid.

Advantageously, the propulsion assembly has a pump which is fluidically connected to the outer volume and is arranged to set the fluid in the outer volume in motion.

According to one particular embodiment, the outer volume is evacuated.

Advantageously, the outer wall is equipped with fins.

According to one particular embodiment, the duct portion surrounds the nozzle wall.

According to one particular embodiment, the duct portion extends around the nozzle wall over an angular portion.

The invention also proposes an aircraft having at least one propulsion assembly according to one of the above variants.

BRIEF DESCRIPTION OF THE DRAWINGS

The aforementioned features of the invention, along with others, will become more clearly apparent on reading the following description of one exemplary embodiment, said description being given with reference to the appended drawings, in which.

DETAILED DESCRIPTION OF THE PREFERRED EMBODIMENTS

Figure 1:
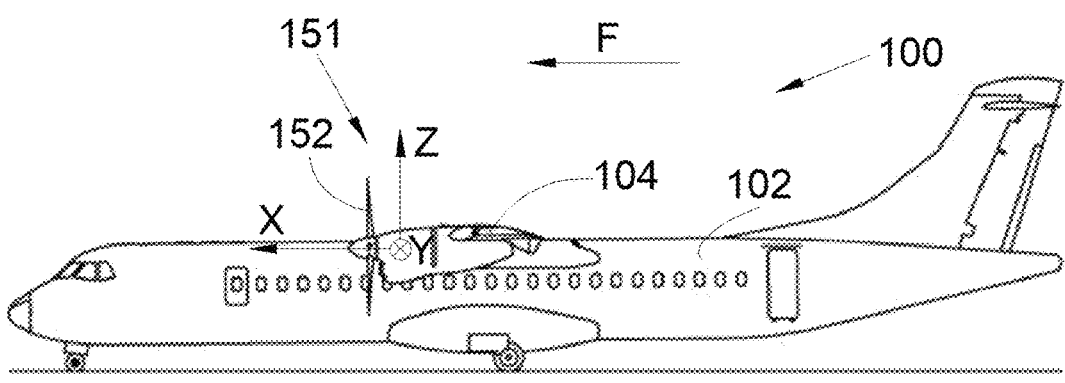
FIG. 1 is a side view of an aircraft having a propulsion assembly according to the invention.

In the following description, terms relating to a position are considered in relation to an aircraft in a position of forward movement, which is to say as shown in FIG. 1, in which the arrow F shows the direction of forward movement of the aircraft.

FIG. 1 shows an aircraft 100 that has a fuselage 102 on each side of which a wing 104 is fixed. At least one propulsion assembly 151 is fixed under each wing 104.

Figure 2:
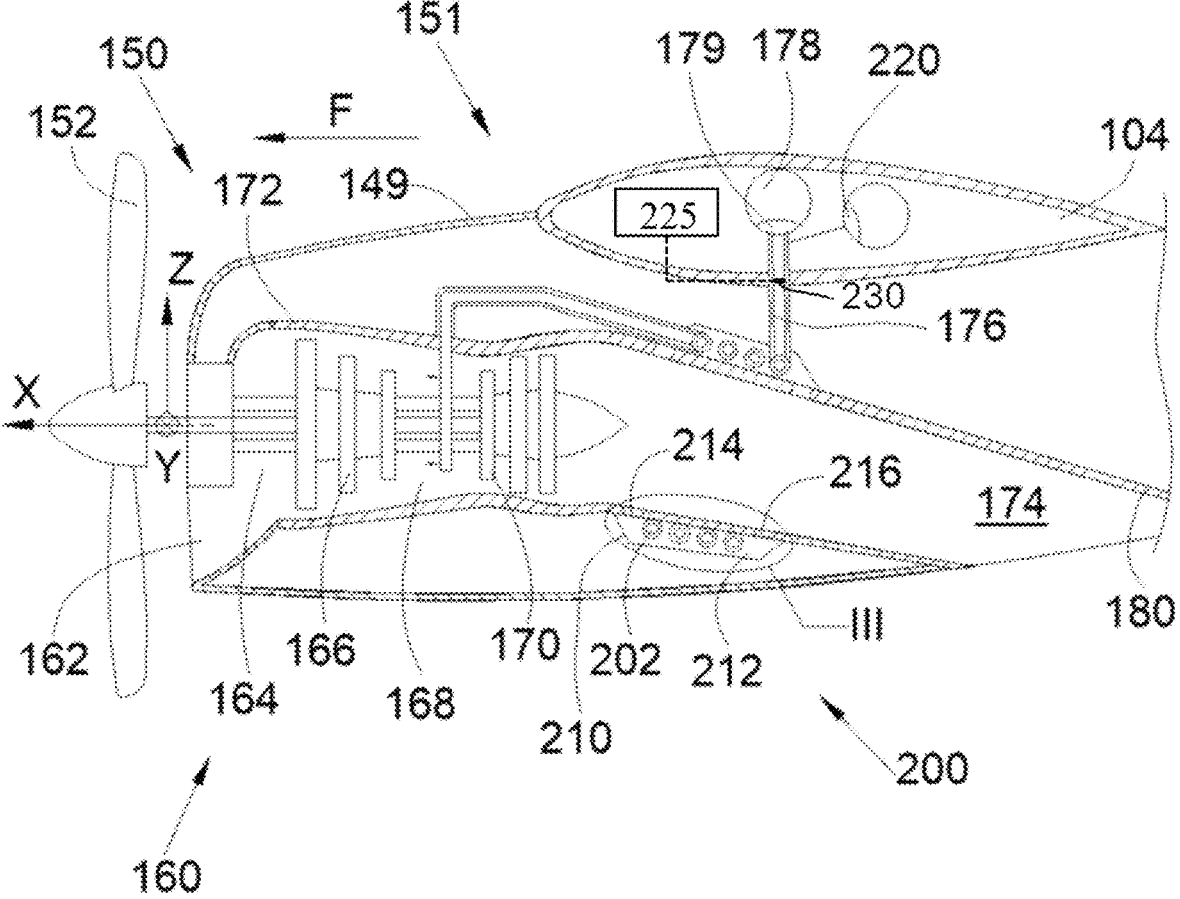
FIG. 2 is a schematic representation, from the side and in section, of a propulsion assembly according to the invention.

FIG. 2 shows the propulsion assembly 151, which comprises a nacelle 149 and a propulsion system 150 surrounded by the nacelle 149. In the embodiment of the invention that is presented here, the propulsion system 150 takes the form of a turboprop engine with a propeller 152 driven in rotation by a rotary assembly mounted inside a fairing 172 of the propulsion system 150 housed inside the nacelle 149, but the propulsion system 150 may also take the form of a jet engine that drives a fan. Thus, the propulsion system 150 generally has a rotary assembly and a mobile element 152 (propeller or fan).

In the following description, and by convention, X refers to the longitudinal axis, which corresponds to the axis of rotation of the movable element 152 with positive orientation in the direction of forward movement of the aircraft 100; Y refers to the transverse axis, which is horizontal when the aircraft is on the ground; and Z refers to the vertical axis or vertical height when the aircraft is on the ground, these three axes X, Y and Z being mutually orthogonal.

FIG. 2 shows the propulsion system 150 in the case of a turboprop engine. A rotary assembly 160 constitutes a core of the propulsion system 150 and, from the front to the rear, has an air inlet 162 which allows the introduction of air into a duct 164 of the core, a compressor 166 which compresses the air thus introduced, a combustion chamber 168 in which the air thus compressed is mixed with the dihydrogen and the mixture is burned, and a turbine 170 which allows the combustion gases to expand and which generates the rotation which is transmitted to the movable element, in this instance the propeller 152. The elements of the rotary assembly 160 are surrounded by the fairing 172 formed of structural casings that are mounted around the elements of the rotary assembly 160 and make it possible to stiffen it, in order in particular to limit distortions thereof during operation.

The fairing 172 is, on the one hand, open to the front at the air inlet 162 and delimits the duct 164 and is, on the other hand, open to the rear at an exhaust nozzle 174 which is downstream of the turbine 170 and therefore of the combustion chamber 168 and ensures the discharge of the combustion gases originating from the combustion of the dihydrogen and the air in the combustion chamber 168. The rear part of the fairing 172 that surrounds the exhaust nozzle 174 forms the nozzle wall 180.

The space between the nacelle 149 and the fairing 172 is occupied by various systems that ensure the operation of the propulsion system 150. In particular, in order to supply dihydrogen to the combustion chamber 168, the propulsion assembly 151 has a dihydrogen tank 178 which in this instance is housed in the wing 104, a supply duct 176 which connects the tank 178 and the combustion chamber 168, and a pump 179 which moves the dihydrogen from the tank 178 to the combustion chamber 168 through the supply duct 176. Without departing from the scope of the invention, the dihydrogen tank 178 may also be housed in another part of the aircraft 100, for example in the fuselage 102.

In order to heat the dihydrogen before it is injected into the combustion chamber 168, so as to achieve better combustion, the propulsion assembly 151 also has a heat exchanger system 200, which is arranged in the space between the nacelle 149 and the fairing 172, and which is arranged, when the propulsion system 150 is in operation, to ensure heat energy is exchanged between the hot combustion gases circulating in the exhaust nozzle 174 and the colder dihydrogen circulating in the supply duct 176.

The propulsion assembly 151 has a cowling 210 which is fixed, preferably in sealed fashion, to the nozzle wall 180 and on the outside thereof, and wherein the cowling 210 and the nozzle wall 180 define between them a bypass chamber 212 which is thus positioned around the nozzle wall 180. The cowling 210 is fixed for example by welding or riveting along the periphery of the cowling 210.

At least one upstream orifice 214 forming an inlet for air towards the bypass chamber 212 and at least one downstream orifice 216 forming an outlet for air from the bypass chamber 212 are made in the nozzle wall 180 to ensure the circulation of the hot combustion gases in the bypass chamber 212.

Each upstream orifice 214 is arranged to allow the introduction of the hot combustion gases from the exhaust nozzle 174 into the bypass chamber 212 and each downstream orifice 216 is arranged to allow the discharge of the hot combustion gases from the bypass chamber 212 towards the exhaust nozzle 174.

Each upstream orifice 214 is located at a front part of the cowling 210 and the or each downstream orifice 216 is located at a rear part of the cowling 210.

The heat exchanger system 200 comprises a duct portion 202 which is a portion of the supply duct 176 that is arranged in said bypass chamber 212 and heat energy is exchanged at this duct portion 202.

The duct portion 202 thus passes through the cowling 210 a first time by starting from the dihydrogen tank 178, whereupon it enters the bypass chamber 212 and passes through the cowling 210 a second time, whereupon it leaves the bypass chamber 212 and reaches the combustion chamber 168.

Thus, the duct portion 202 is fixed in the bypass chamber 212 in the vicinity of the nozzle wall 180 and the dihydrogen is heated directly in the supply duct 176.

The hot combustion gases thus enter the bypass chamber 212, whereupon they heat the dihydrogen circulating in the supply duct 176 before reaching the combustion chamber 168.

In addition, for safety reasons, it is provided that the supply duct 176, and in particular the duct portion 202, is a double-walled duct with an inner wall delimiting an inner volume in which the dihydrogen circulates and an outer wall which is around the inner wall, an outer volume not containing dihydrogen in normal operating conditions, which is to say when there is no leak, being delimited between the inner wall and the outer wall.

As a result, even if there is a leak at the inner wall, the dihydrogen will spread out in the outer volume while remaining isolated.

The outer volume may be evacuated or it may be filled with a fluid inert with respect to the dihydrogen, such as dinitrogen for example.

In the event of a leak at the outer wall, the inert fluid will spread out of the outer volume or the outer volume will become filled with hot combustion gases.

In order to prevent a dihydrogen leak at the duct portion 202, the heat exchanger system 200 may have leak detection means and a control unit 225 connected to the leak detection means. The heat exchanger system 200 also has a valve 230 mounted on the supply duct 176 upstream of the duct portion 202 with respect to the direction of flow of the dihydrogen and made to open and close by the control unit 225. The control unit 225 makes the valve 230 close when the leak detection means detect a leak.

The leak detection means are for example pressure sensors positioned in the outer volume. A leak of the inner wall or of the outer wall will be detected by the pressure sensors owing to a change in the pressure in the outer volume: for example, a leak of the inner wall will be detected if the pressure in the outer volume is substantially equal to the pressure of dihydrogen in the inner volume and a leak of the outer wall will be detected if the pressure in the outer volume is substantially equal to the pressure of the atmosphere outside the duct portion 202.

When the outer volume is evacuated, the outer volume is for example fluidically connected to a vacuum pump.

When the outer volume is filled with a fluid, the latter may be static or in motion. When it is static, the fluid is not in motion inside the outer volume and in this case, the outer volume is preferably fluidically connected to an expansion vessel which makes it possible to adapt the pressure to the temperature of the fluid.

According to another embodiment, the heat exchanger system 200 has a pump 220 which is fluidically connected to the outer volume and is arranged to set the fluid in the outer volume in motion.

Figure 3:
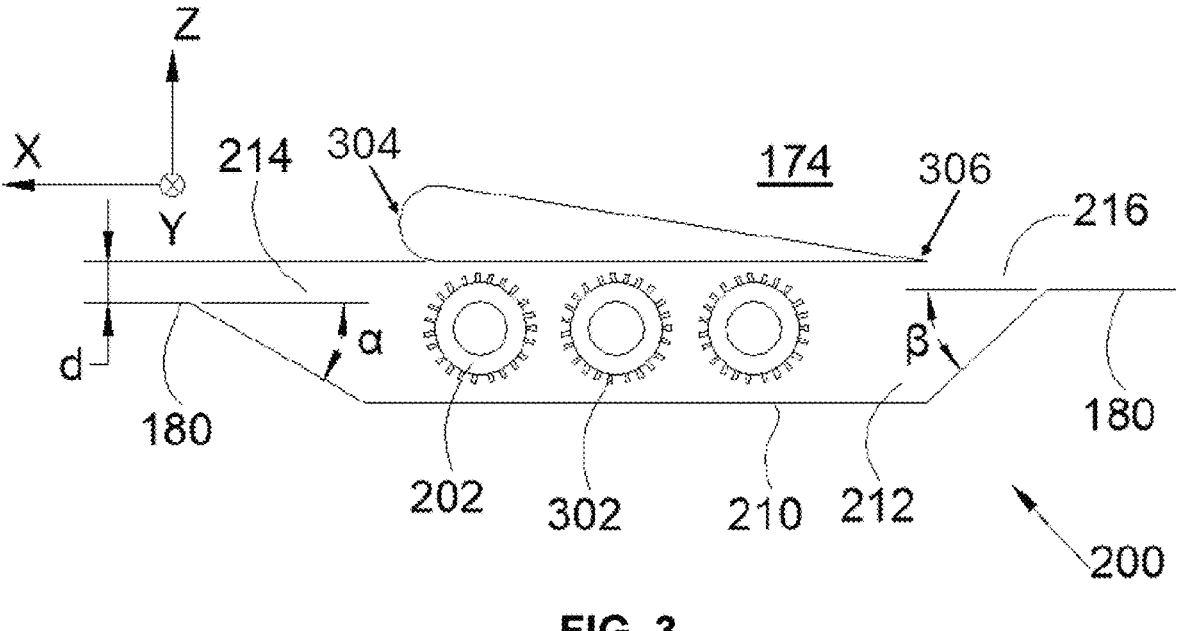
FIG. 3 is a schematic representation of the detail III in FIG. 2.

FIG. 3 shows an enlarged view of zone III for one particular embodiment.

The duct portion 202 may be formed of multiple channels, each having a double wall, and the channels are supplied by a double manifold, wherein a first manifold supplies fluid to the various outer volumes and wherein a second manifold supplies dihydrogen to the various inner volumes.

To improve the exchange of heat between the hot combustion gases and the dihydrogen, the outer wall is equipped with fins 302 which are produced from a material with high thermal conductivity integral with the outer wall. The fins are immersed in the hot combustion gases.

In one particular embodiment, the duct portion 202 surrounds the nozzle wall 180 and it thus has at least one turn that goes around the nozzle wall 180. Such a positioning increases the transfer of heat energy from the hot combustion gases.

According to another particular embodiment, the duct portion 202 extends around the nozzle wall 180 but only over an angular portion around the longitudinal axis X.

In the embodiment of the invention shown in FIG. 3, the nozzle wall 180 which is between the upstream orifice 214 and the downstream orifice 216 takes the form of an aerodynamic profile having a rounded leading edge 304 at the upstream orifice 214 and downstream thereof, and a trailing edge 306 at the downstream orifice 216, and upstream thereof.

To ensure good penetration of the hot combustion gases through the upstream orifice 214, the leading edge 304 is at a spacing towards the inside of the exhaust nozzle 174 from the nozzle wall 180 which is upstream of the upstream orifice 214 so as to leave a passage free for the hot combustion gases. The distance 'd' shows this spacing.

At the upstream orifice 214, the cowling 210 has an angle α of from 10° to 15° with respect to the nozzle wall 180 which is upstream of the upstream orifice 214.

At the downstream orifice 216, the cowling 210 has an angle β of from 30° to 40° with respect to the nozzle wall 180 which is downstream of the downstream orifice 216.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft, having:
   a nacelle;
   a propulsion system arranged inside the nacelle and comprising a fairing, a rotary assembly having a combustion chamber and housed in the fairing, an exhaust nozzle positioned downstream of the combustion chamber and delimited by a rear portion of the fairing, referred to as a nozzle wall, and configured to ensure a discharge of combustion gases originating from com-
bustion of dihydrogen in the combustion chamber;

a dihydrogen tank;

a supply duct which connects the tank and the combustion
chamber and is a double-walled duct with an inner wall
delimiting an inner volume in which the dihydrogen
circulates and, around the inner volume, an outer wall
delimiting an outer volume;

a bypass chamber positioned around the nozzle wall;

a heat exchanger, including a duct portion to transport the
dihydrogen, arranged within the bypass chamber and
configured to heat the dihydrogen prior to supplying the
dihydrogen to the combustion chamber;

a leak detection means, being a pressure sensor arranged
in the outer volume of the supply duct, connected to the
heat exchanger and configured to, via a control unit,
detect a leak in the heat exchanger; and a valve mounted on the supply duct arranged upstream of
the heat exchanger and configured to, via the control
unit, close when the leak detection means detects the
leak in the heat exchanger, wherein at least one upstream orifice introduces the
combustion gases into the bypass chamber, and at least
one downstream orifice discharges the combustion
gases from the bypass chamber, are made in the nozzle
wall, and wherein the supply duct has a duct portion arranged in the
bypass chamber.

2. The propulsion assembly according to claim 1, wherein
the outer volume contains a fluid.

3. The propulsion assembly according to claim 2, further
comprising:

a pump fluidically connected to the outer volume and
arranged to set the fluid in the outer volume in motion.

4. The propulsion assembly according to claim 1, wherein
the outer volume is evacuated.

5. The propulsion assembly according to claim 1, wherein
the outer wall is equipped with fins.

6. The propulsion assembly according to claim 1, wherein
the duct portion surrounds the nozzle wall.

7. The propulsion assembly according to claim 1, wherein
the duct portion extends around the nozzle wall over an
angular portion.

8. An aircraft comprising:

at least one propulsion assembly according to claim 1.

9. The propulsion assembly according to claim 1, wherein
the pressure sensor measures a pressure and is configured to
detect, via the control unit, the leak of one or more of the
inner wall or the outer wall.

10. The propulsion assembly according to claim 9,
wherein the leak detection means determines at least one of,
via the control unit: the leak being at the inner wall when the
pressure measured at the outer volume is substantially equal
to a pressure of the dihydrogen in the inner volume; or the
leak being at the outer wall when the pressure measured at
the outer volume is substantially equal to a pressure of the
atmosphere outside of the duct portion of the heat exchanger.

11. A propulsion assembly for an aircraft, having:

a nacelle;

a propulsion system arranged inside the nacelle and
comprising a fairing, a rotary assembly having a com-
bustion chamber and housed in the fairing, an exhaust
nozzle positioned downstream of the combustion
chamber and delimited by a rear portion of the fairing,
referred to as a nozzle wall, the nozzle wall having a
portion configured as an aerodynamic profile having a
leading edge portion and a trailing edge portion, and
configured to ensure a discharge of combustion gases
originating from combustion of dihydrogen in the com-
bustion chamber;

a dihydrogen tank;

a supply duct which connects the tank and the combustion
chamber and is a double-walled duct with an inner wall
delimiting an inner volume in which the dihydrogen
circulates and, around the inner volume, an outer wall
delimiting an outer volume;

a bypass chamber positioned around the nozzle wall; a
heat exchanger, including a duct portion to transport the
dihydrogen, arranged within the bypass chamber and
configured to heat the dihydrogen prior to supplying the
dihydrogen to the combustion chamber;

a leak detection means, being a pressure sensor arranged
in the outer volume of the supply duct, connected to the
heat exchanger and configured to, via a control unit,
detect the leak in the heat exchanger; and a valve mounted on the supply duct arranged upstream of
the heat exchanger and configured to, via the control
unit, close when the leak detection means detects a leak
in the heat exchanger, wherein at least one upstream
orifice, introduces the combustion gases into the bypass
chamber, and at least one downstream orifice, dis-
charges the combustion gases from the bypass cham-
ber, are made in the nozzle wall, the upstream orifice
being at the leading edge portion of the nozzle wall and
the downstream orifice being at the trailing edge por-
tion of the nozzle wall, and wherein the supply duct has a duct portion arranged in
said bypass chamber.

12. The propulsion assembly according to claim 11,
wherein the leading edge portion is spaced from the nozzle
wall towards the exhaust nozzle a distance to allow the
combustion gases to pass into the bypass chamber.

13. The propulsion assembly according to claim 11,
further including a cowling fixed to the nozzle wall, the
cowling surrounding the bypass chamber and overlapping
the nozzle wall.

14. The propulsion assembly according to claim 13,
wherein the cowling has an angle $\alpha$ with respect to the
nozzle wall at which the cowling overlaps the nozzle wall at
an upstream portion at the upstream orifice between and
including 10°-15°.

15. The propulsion assembly according to claim 13,
wherein the cowling has an angle $\beta$ with respect to the
nozzle wall at which the cowling overlaps the nozzle wall at
a downstream portion at the downstream orifice between and
including 30°-40°.

* * * * *